United States Patent
Herzberg et al.

(10) Patent No.: US 9,759,161 B2
(45) Date of Patent: Sep. 12, 2017

(54) PROPULSION SYSTEM AND LAUNCH VEHICLE

(71) Applicant: The Boeing Company, Chicago, IL (US)

(72) Inventors: James S. Herzberg, Long Beach, CA (US); Robert J. Budica, Laguna Hills, CA (US); Frank O. Chandler, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 867 days.

(21) Appl. No.: 14/228,306

(22) Filed: Mar. 28, 2014

(65) Prior Publication Data

US 2015/0275823 A1    Oct. 1, 2015

(51) Int. Cl.

| F02K 9/62 | (2006.01) |
|---|---|
| F02K 9/80 | (2006.01) |
| F02K 9/68 | (2006.01) |
| F02K 9/48 | (2006.01) |
| F02K 9/46 | (2006.01) |
| F02K 9/44 | (2006.01) |
| F02K 9/42 | (2006.01) |

(52) U.S. Cl.
CPC .............. F02K 9/62 (2013.01); F02K 9/68 (2013.01); F02K 9/80 (2013.01); *F02K 9/42* (2013.01); *F02K 9/44* (2013.01); *F02K 9/46* (2013.01); *F02K 9/48* (2013.01); *F05D 2270/051* (2013.01)

(58) Field of Classification Search
CPC ..... F02K 9/42; F02K 9/44; F02K 9/46; F02K 9/48; F02K 9/62; F02K 9/68
See application file for complete search history.

(56) References Cited

U.S. PATENT DOCUMENTS

| 2,563,029 | A | * | 8/1951 | Goddard | ................... F02K 9/66 |
|---|---|---|---|---|---|
| | | | | | 60/201 |
| 3,091,520 | A | * | 5/1963 | Newburn | ................... F02K 9/68 |
| | | | | | 422/218 |
| 3,173,250 | A | * | 3/1965 | Matzenauer | .............. F02K 9/62 |
| | | | | | 60/225 |
| 3,230,701 | A | * | 1/1966 | Mullen, II | .............. C06B 43/00 |
| | | | | | 60/207 |
| 3,577,735 | A | * | 5/1971 | Schmidt | .................... F02K 9/48 |
| | | | | | 415/208.2 |

(Continued)

OTHER PUBLICATIONS

Space Shuttle Main Engine (SSME) Orientation, Boeing Space Transportation System Training Data, BC98-04, Jun. 1998, pp. 1-105.*

*Primary Examiner* — Lorne Meade
(74) *Attorney, Agent, or Firm* — Miller, Matthias & Hull LLP (57) ABSTRACT

A rocket engine having a co-axial, bidirectional flow arrangement is described herein. The rocket engine receives fuel and an oxidizer into the rocket engine in a first direction, whereby a portion of the fuel is combusted in a pre-burner. The flow direction of the partially combusted fuel/oxidizer mixture is reversed, whereby the mixture is introduced into a combustion chamber. The fuel and oxidizer are combusted in the combustion chamber. The combustion products exit a throat and an expansion plenum in a direction similar to the first direction, whereby the combustion products exit a nozzle of the rocket engine, providing thrust.

21 Claims, 7 Drawing Sheets

(56) References Cited

U.S. PATENT DOCUMENTS

| | | | | |
|---|---|---|---|---|
| 3,772,885 A | * | 11/1973 | Munding | F02K 9/68 60/207 |
| 4,073,138 A | * | 2/1978 | Beichel | F02K 9/48 60/245 |
| 6,205,770 B1 | * | 3/2001 | Williams | F02K 9/48 60/204 |
| 6,619,031 B1 | * | 9/2003 | Balepin | B64G 1/401 60/246 |
| 7,690,192 B2 | * | 4/2010 | Pederson | F02K 9/48 60/251 |

* cited by examiner

PROPULSION SYSTEM AND LAUNCH VEHICLE

BACKGROUND

Conventional liquid rocket engines like the Saturn V's S-1C stage F-1, the Space Shuttle's SSME, the Delta 1-3 RS-27, Delta 4's RS-68 and RL-10, typically used in upper stages, are based on a convergent-divergent/Rao nozzle configuration for simplicity and performance. Their performance is traditionally measured in terms of specific impulse (Isp) and thrust-to-weight ratio (T/We). The performance of one or more of these types of engines can suffer from the atmospheric pressure effect on thrust. This results in a negative effect on Isp and weight due to linear integration of the combustion gas flow elements including power head, injector system, combustion chamber and nozzle.

Alternate configurations have been developed that use atmospheric pressure compensating nozzles that can, in some configurations, reduce the thrust and Isp penalty during atmospheric operation. These include the symmetric plug nozzle demonstrated by Pratt & Whitney Rocketdyne (PWR) and the 2-D PWR Aerospike that was to be used on the Lockheed Martin X-33. The alternate Expansion-Deflection nozzle concept also compensates for atmospheric pressure effects by permitting internal flow separation and pressure equalization. However, while these concepts can reduce thrust and Isp losses during the atmospheric flight phase, their weight and resulting lower T/We penalizes the overall mission performance measured by payload weight.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a method for operating a rocket engine is disclosed. The method includes introducing fuel and oxidizer into the rocket engine in a first fluid flow direction, pre-burning a portion of the fuel in a pre-burner to produce a partially combusted fuel oxidizer mixture, reversing a flow of the partially combusted fuel oxidizer mixture to a second fluid flow direction, combusting at least a portion of fuel in the partially combusted fuel oxidizer mixture in a combustion chamber to produce combustion products, and reversing a flow of the combustion products to a third fluid flow direction.

According to another embodiment disclosed herein, a rocket engine is disclosed. The rocket engine includes a fuel supply line and an oxidizer supply line for introducing fuel and oxidizer into a pre-burner in a first fluid flow direction. The pre-burner is operative to combust at least a portion of the fuel introduced through the fuel supply line to produce a partially combusted fuel oxidizer mixture, and reverse a flow of the partially combusted fuel oxidizer mixture to a second fluid flow direction, whereby the first fluid flow direction and the second fluid flow direction are opposing directions. The rocket engine further includes a combustion chamber operative to combust at least a portion of the partially combusted fuel oxidizer mixture, whereby the combusted fuel oxidizer mixture exits through a throat and an expansion plenum, and a nozzle having a shape operative to reverse a flow of the combusted fuel oxidizer mixture to a third fluid flow direction.

According to yet another embodiment disclosed herein, a launch vehicle is disclosed. The launch vehicle includes a rocket engine firmly affixed to a bulkhead of the launch vehicle. The rocket engine includes a fuel supply line and an oxidizer supply line for introducing fuel and oxidizer into a pre-burner in a first fluid flow direction. The pre-burner is operative to combust at least a portion of the fuel introduced through the fuel supply line to produce a partially combusted fuel oxidizer mixture, and reverse a flow of the partially combusted fuel oxidizer mixture to a second fluid flow direction, whereby the first fluid flow direction and the second fluid flow direction are opposing directions. The rocket engine also includes a combustion chamber operative to combust at least a portion of the partially combusted fuel oxidizer mixture, whereby the combusted fuel oxidizer mixture exits through a throat and an expansion plenum, and a nozzle having a shape operative to reverse a flow of the combusted fuel oxidizer mixture to a third fluid flow direction generally in a same direction as the first fluid flow direction.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed a rocket engine and a launch vehicle using the rocket engine. In some configurations, the rocket engine utilizes a co-axial, bidirectional flow arrangement. Liquid fuel enters the rocket engine in a first direction along generally the same axis that an oxidizer enters the rocket engine. The fuel and a portion of the oxidizer exit into a pre-burner section. The fuel is partially combusted. The fluid flow direction of the partially combusted fuel/oxidizer mixture reverses direction and flows in an opposing or second direction to the incoming fuel and oxidizer.

The partially combusted fuel/oxidizer mixture powers one or more turbine assemblies. The turbine assemblies are used to pump the partially combusted fuel/oxidizer mixture into a high pressure combustion chamber, where an additional amount of oxidizer is introduced. The combustion products exit the combustion chamber through a nozzle, reversing flow direction again to flow in a third direction that is generally in the same direction as the first direction of flow. The combustion products expand past the nozzle and exit the rocket engine, providing some degree of thrust.

In some configurations, reversing the fluid flow can provide some benefits. For example, the reversing of the fluid flow can provide for a more compact and relatively lighter weight design. In some examples, the combustion chamber can be operated at a high pressure, producing a relatively high nozzle expansion ratio. In some instances, the high ratio can result in high performance exit pressure and Isp.

Further, in other instances, the rocket engine can achieve weight gains over conventional, similarly powered rocket engines. The reduced weight can increase the effective thrust to weight ratio. For example, whereas some conventional rocket engines may achieve thrust to weight ratios from 31-150, some configurations of the presently disclosed subject matter may achieve thrust to weight ratios greater than 150. Referring now to the drawings, aspects of the present disclosure will be presented.

Figure 1:
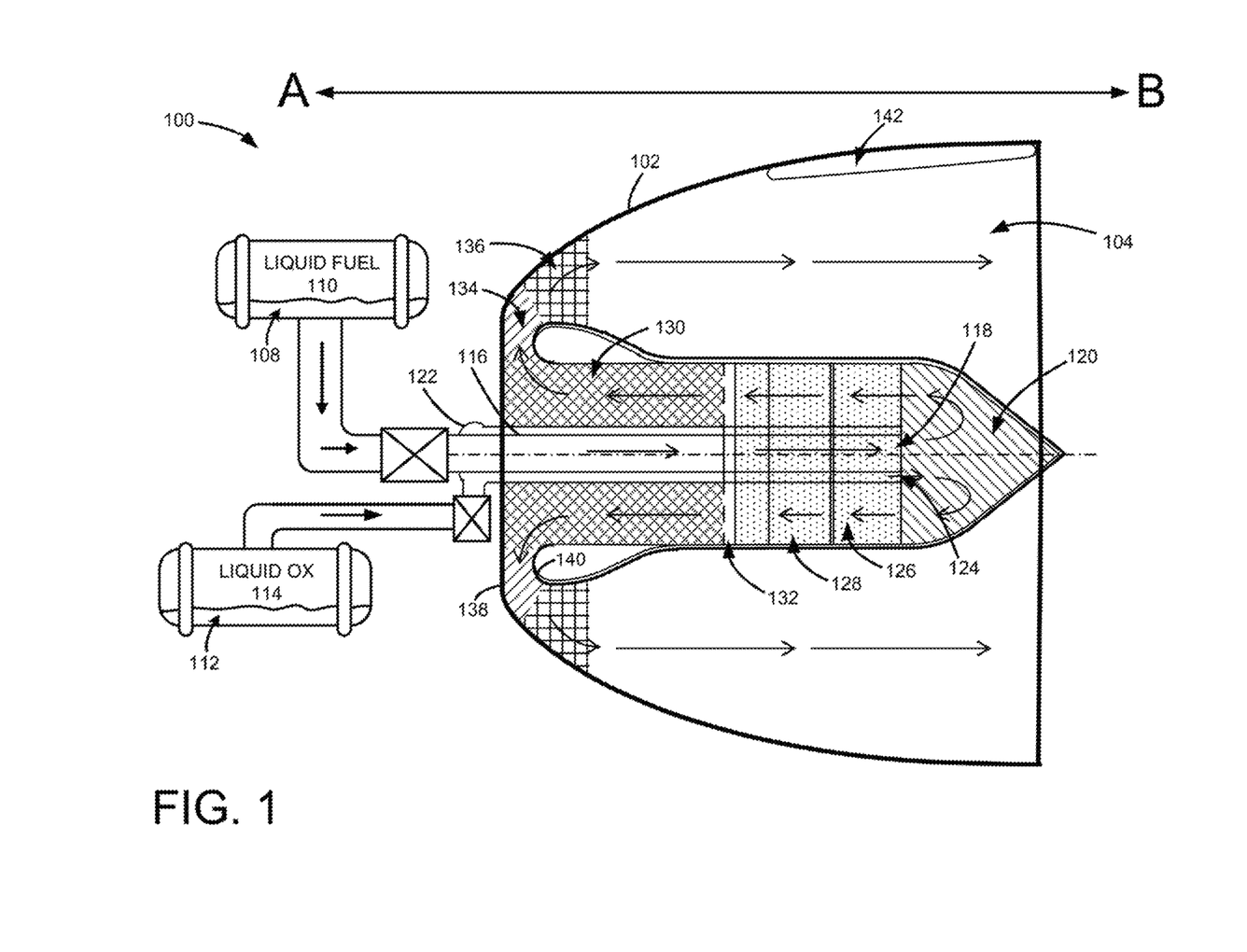
FIG. 1 is a cross-sectional view of a liquid rocket engine according to at least one embodiment disclosed herein.

FIG. 1 is a cross-sectional view of a rocket engine 100 according to at least one embodiment disclosed herein. The rocket engine 100 is a liquid oxide rocket engine. It should be appreciated that the rocket engine 100 and other components are not drawn to scale. The rocket engine 100 includes a nozzle 102 from which combusted fluids are exhausted. Although not limited to any particular shape or design, in some examples, the nozzle 102 can be a Bell-shaped or Contoured nozzle. In a contoured nozzle design, the nozzle 102 has a high angle expansion section flowing to a low angle nozzle exit 104.

It should be noted that the transition between various portions or sections of the rocket engine 100 may not have clearly definable or delineated boundaries, as there may be a transition between the various portions or sections. Thus, although the present disclosure may refer to a portion of the figures as being a particular component or area, it should be understood that, unless specified otherwise, neither the description nor any manner in which the component or area is illustrated in the figures connotes a delineated boundary. There may be transitions between areas that are not illustrated or illustratable.

As mentioned briefly above, the rocket engine 100 is a liquid oxide rocket engine, sometimes referred to as a liquid-propellant rocket. A liquid-propellant rocket uses propellants in liquid form. In one example, the rocket engine 100 is a bipropellant liquid rocket, using as propellants a fuel 108 supplied from a liquid fuel tank 110 and an oxidizer 112 supplied from a liquid oxidizer tank 114.

The fuel 108 and the oxidizer 112 combination may vary depending on the particular application. Some examples of combinations include, but are not limited to, liquid oxygen and liquid hydrogen, liquid oxygen (LOX) and kerosene, liquid oxygen (LOX) and alcohol, and hydrazine and its derivatives in combination with nitrogen oxides. It should be appreciated that these and other suitable combinations of the fuel 108 and the oxidizer 112 may be used and are considered to be within the scope of the present disclosure.

The fuel 108 exits the liquid fuel tank 110 and travels through a fuel supply line 116, where it exits at fuel outlet 118 into a pre-burner 120. Similarly, the oxidizer 112 travels from the liquid oxidizer tank 114 through oxidizer supply line 122 and exits primary oxidizer outlet 124 into the pre-burner 120. Both the fuel 108 and the oxidizer 112 travel in a coaxial manner along the axis AB in a first direction extending from point A to point B. Although the present disclosure is not limited to any particular benefit, having the fuel 108 and the oxidizer 112 travel into the pre-burner 120 in a coaxial manner may provide some benefits in certain configurations. For example, in some examples, the coaxial flow may help to ensure that the fuel 108 and the oxidizer 112 enter the pre-burner 120 at similar temperatures. In another example, the coaxial flow may reduce the number of penetrations into various components necessary to introduce the fuel 108 and the oxidizer 112 into the pre-burner 120.

The pre-burner 120 may be used to combust a portion of the fuel 108 to produce hot gases. The hot gases power coaxial assembly turbines 126. The coaxial assembly turbines 126 in turn power propellant pumps assembly 128. The propellant pumps assembly 128 supplies the pressure necessary to feed the fuel/oxidizer mixture in a second direction from the pre-burner 120 into a combustion chamber 130. The second direction of flow is generally opposite to the first direction of flow. As described, the rocket engine 100 is a pump fed feed system. It should be understood that the use of a pump fed feed system is merely exemplary, as a pressure fed system, in which the pressure of the tanks is used to drive the fuel/oxidizer combination, may be used and is considered to be within the scope of the present disclosure.

The combustion chamber 130 is the portion of the rocket engine 100 in which the fuel 108 and the oxidizer 112 are combusted to generate highly pressurized exhaust gases. Because a portion of the oxidizer 112 was combusted in the pre-burner 120, to fully combust the fuel 108 in the combustion chamber 130, additional oxidizer 112 may be introduced into the combustion chamber 130 using oxidizer injector assembly 132.

The oxidizer injector assembly 132 may introduce various amounts of oxidizer 112 to attempt to achieve proper stoichiometric proportions between the fuel 108 and the oxidizer 112 in the combustion chamber 130. If stoichiometric proportions are not present in the combustion chamber 130, unburned fuel 108 may exit the combustion chamber 130 and enter the nozzle exit 104. In some examples, this may reduce the efficiency of the rocket engine 100.

The oxidizer injector assembly 132 may also be used to introduce various amounts of the oxidizer 112 to provide for directional control. For example, in some configurations, the flow of the fuel 108 and the oxidizer 112 exiting the pre-burner 120 may flow in one general vector. The oxidizer 112 may be introduced at various locations to increase an amount of energy release in one vector, which in turn, can influence the direction of the rocket engine 100. An example of thrust vectoring using the oxidizer injector assembly 132 is explained in more detail in FIG. 2, below.

In a manner different in which the fuel 108 and the oxidizer 112 travel into the pre-burner 120, the gases from the pre-burner 120 and the combustion chamber 130 travel along the axis AB from a direction extending from point B to point A. Thus, in the pre-burner 120, the general direction of fluid flow within the rocket engine 100 reverses from a direction from point A to point B to a direction from point B to point A.

The reversal of direction can allow at least one manner in which the length of the rocket engine 100 is reduced. For example, at least a portion of the length of the tubing necessary to introduce either the fuel 108 or the oxidizer 112 into the rocket engine 100 can be placed within other components such as, but not limited to, the propellant pumps assembly 128 and the coaxial assembly turbines 126.

The combusted gases exit the combustion chamber 130 through a throat 134, into an expansion plenum 136, and out through the nozzle exit 104. The throat 134 may be configured to work in combination with the conditions in the combustion chamber 130 to constrict the flow of combusted gases. This may help form an exhaust jet, which in some configurations may maximize the velocity of the exhausted gases from the combustion chamber 130 into the nozzle exit 104. In some examples, the shape and design of the throat 134 and the expansion plenum 136 may convert at least a portion of the potential energy of the combusted gases into kinetic energy by allowing the combusted gases to expand into the nozzle 102, converting the pressure in the combustion chamber 130 to velocity in the nozzle 102.

In some examples, the contours of the throat 134 and the nozzle exit 104 may be configured to reduce or preclude internal shock formation by flow-turning compression processes and wall impingement, which would reduce exhaust gas velocity. The reduced velocity may negatively impact the Isp of the rocket engine 100. Further, impingement of the exhaust gases on various components may increase the temperature of a component or section beyond an expected and desired operating temperature, requiring additional cooling of the impinged component or section, possibly negatively affecting the thrust to weight ratio.

For example, the contour of the nozzle wall 138, an inner wall of the rocket engine 100 associated with the nozzle 102, and the throat wall 140, may be configured to provide a smooth transition from the combustion chamber 130 to the nozzle exit 104. The smooth transition preferable reduces the differential pressure between the center line of flow of exhaust gases and the pressure felt at the nozzle wall 138 or the throat wall 140 along the length of the flow of the combusted gases. A significant differential pressure may indicate that gases are flowing more towards the nozzle wall 138 or the throat wall 140 rather than in a direction generally along the flow of the combusted gases, characterized as impingement.

Exhaust gases from the combustion chamber 130 experience a change their flow direction, e.g. from a direction of point B to point A in the combustion chamber 130 to a third direction from point A to point B through the nozzle 102. In this regard, the third direction is generally the same as the first direction. A smooth transition from the throat 134 to the expansion plenum 136 and eventually out the nozzle exit 104 can reduce impingement, increasing Isp and the thrust to weight ratio.

In some applications of the rocket engine 100, various surfaces of the rocket engine 100 may need to be cooled in order to prevent damage to the surfaces. Various cooling methods may be used and are considered to be within the scope of the presently disclosed subject matter. For example, the nozzle 102 may be cooled using re-generative cooling methods whereby a portion of the oxidizer 112 is transported through tubes, such as the tube 142. Heat is exchanged between the nozzle 102 and the oxidizer 112 flowing through the tube 142, reducing the temperature of the nozzle while increasing the temperature of the oxidizer 112. In this example, the tube 142 can be one of a series of tubes lining the inner wall of the nozzle 102. The oxidizer 112 may be at a low enough temperature that, given an adequate flow rate, the heat generated by the exhaust gases can be removed. In some configurations, the heating of the oxidizer 112 may also increase the temperature of the oxidizer 112 to a temperature more suitable for use within the rocket engine 100 as an oxidizer. Thus, in this example, the oxidizer 112 is used as a coolant to cool one or more surfaces of the rocket engine 100.

Figure 2:
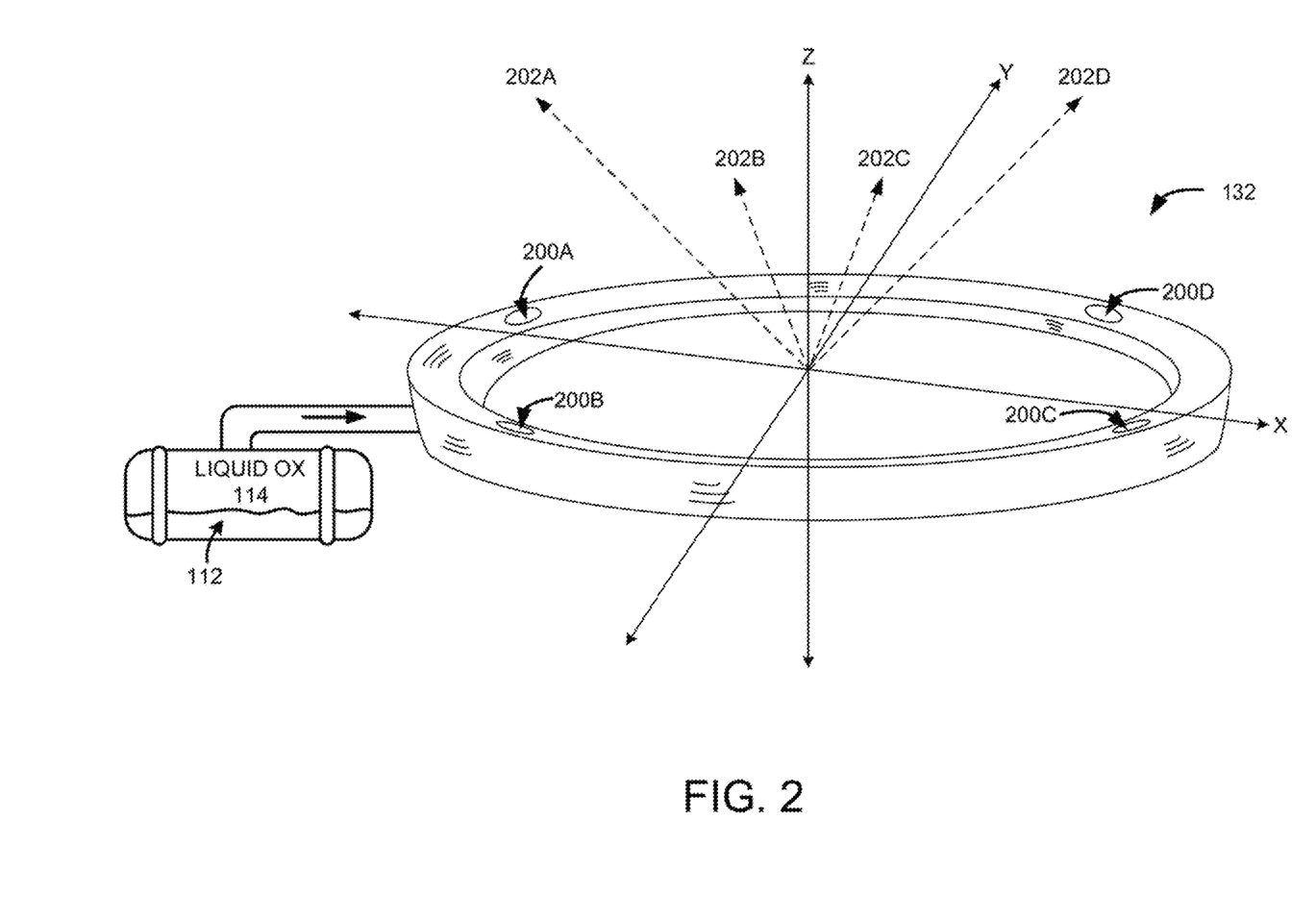
FIG. 2 is a perspective view of an oxidizer injector assembly illustrating thrust vectoring using variable oxidizer injection according to at least one embodiment disclosed herein.

FIG. 2 is a perspective view of the oxidizer injector assembly 132 illustrating thrust vectoring using variable oxidizer injection according to at least one embodiment disclosed herein. It should be appreciated that the size, shape, and other structural or operational characteristics of the oxidizer injector assembly 132 illustrated in FIG. 2 are provided merely to illustrate an embodiment of the presently disclosed subject matter, as other configurations may differ and are also considered to be within the scope of the presently disclosed subject matter.

As mentioned briefly above, the thrust of the rocket engine 100 can be vectored to provide directional control. In one configuration, the amount of the oxidizer 112 injected into the combustion chamber 130 can be adjusted to effect a change in energy along one or more vectors of travel, providing thrust vectoring of the rocket engine 100.

The oxidizer injector assembly 132 shown in FIG. 2 includes one or more oxidizer injector ports 200A-200D. The oxidizer injector ports 200A-200D receive the oxidizer 112 from the liquid oxidizer tank 114. Each of the oxidizer injection ports 200A-200D can be configured to receive individually allotted amounts of the oxidizer 112. Individually controlling the amount of the oxidizer 112 introduced into each of the sections associated with the oxidizer injection ports 200A-200D can affect the stoichiometric ratios between the fuel 108 and the oxidizer 112. Because the fluids flowing through the rocket engine 100 flow in a generally parallel configuration, the fluid flow can be sectioned and controlled.

For example, the fluid flow through the oxidizer injector assembly 132 can be characterized by the three-dimensional axis XYZ. In several configurations, the flow of the gases through the oxidizer injector assembly 132 is generally along the Z-axis, with relatively little direction in either the X-axis or Y-axis. It should be understood, though, that in some configurations, there may be an appreciable amount of flow in the X-axis or Y-axis, as the components of the rocket engine 100 can impart a force on the fluid in either of those directions. The present disclosure is not limited to any degree of motion in either the X-axis or the Y-axis.

When fluid flows in a direction generally along the Z-axis, each of the oxidizer injector ports 200A-200D can be configured to influence thrust vectors 202A-202D. The larger the thrust vector, the greater the thrust felt along the particular vector. Increasing the amount of the oxidizer 112 along a particular one of the thrust vectors 202A-202D can increase the energy released during combustion of the fuel 108 along that particular vector. Increasing the energy released during combustion along the particular vector can increase the thrust felt along that vector, providing for thrust vector control.

For example, it may be desirable to increase the thrust associated with the direction characterized by the thrust vector 202D. A relatively larger amount of the oxidizer 112 may be ported to the injector port 200D. The additional amount of the oxidizer 112 may increase the magnitude of the thrust vector 202D. In a similar manner, the amount of the oxidizer 112 may be decreased in the injector ports 200A-200C to provide a similar effect. Various embodiments of the rocket engine 100 may be used to power launch vehicles, as described by way of example in FIG. 4, below.

Figure 3A:
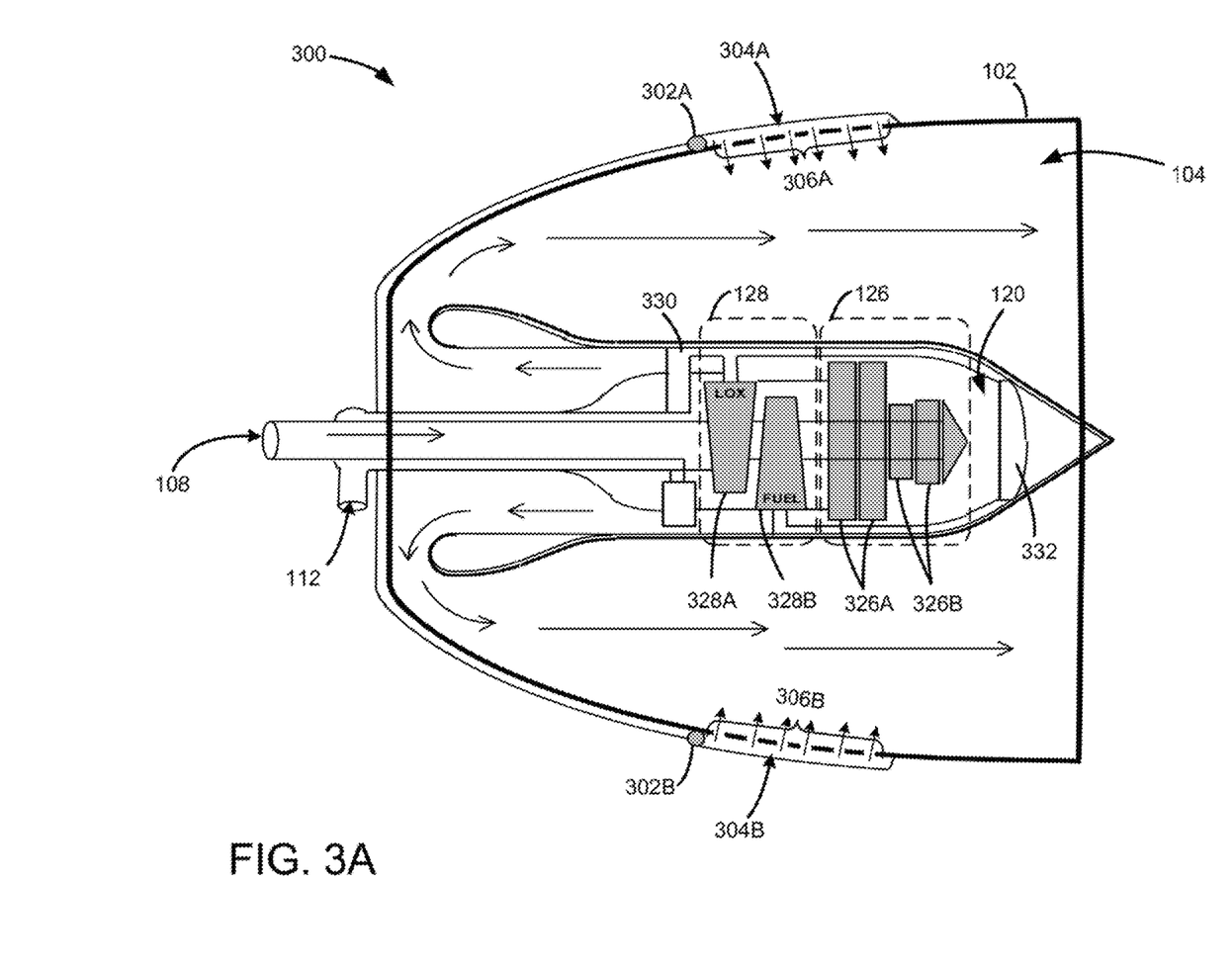
FIG. 3A is a cross-sectional view of an additional example of a liquid rocket engine illustrating thrust vectoring using nozzle injectors according to at least one embodiment disclosed herein.

FIG. 3A is a cross-sectional view of a rocket engine 300 illustrating another example of thrust vectoring according to at least one embodiment disclosed herein. As described above, the rocket engine 100 of FIG. 1 uses the oxidizer injector assembly 132, described in more detail in FIG. 2, to provide thrust vectoring control. Generally, thrust vectoring applies a greater pressure to one or more areas of the nozzle 102 as compared to areas of the nozzle not experiencing thrust vector control. The difference in pressure (force) imparts a force vector on the nozzle. If the force vector is sufficient, the nozzle 102 will move in the direction of the force vector. This provides directional control without the need to gimbal (or move) the nozzle 102 in relation to the vehicle to which it is attached.

The rocket engine 300 illustrates another example of how thrust vectoring may be accomplished. The rocket engine 300 includes thrust vector valves 302A and 302B that allows a portion of the oxidizer 112 into thrust plenums 304A and 304B, respectively. The thrust plenums 304A and 304B are voids or chambers in the wall of the nozzle 102 designed to receive the oxidizer 112. The oxidizer 112 is allowed into the nozzle exit 104 thru thrust vector outlets 306A and 306B. The oxidizer 112 causes increased combustion once introduced into the hot gases in the nozzle exit 104. This increased combustion causes the pressure increase described above, providing for thrust vectoring.

Figure 3B:
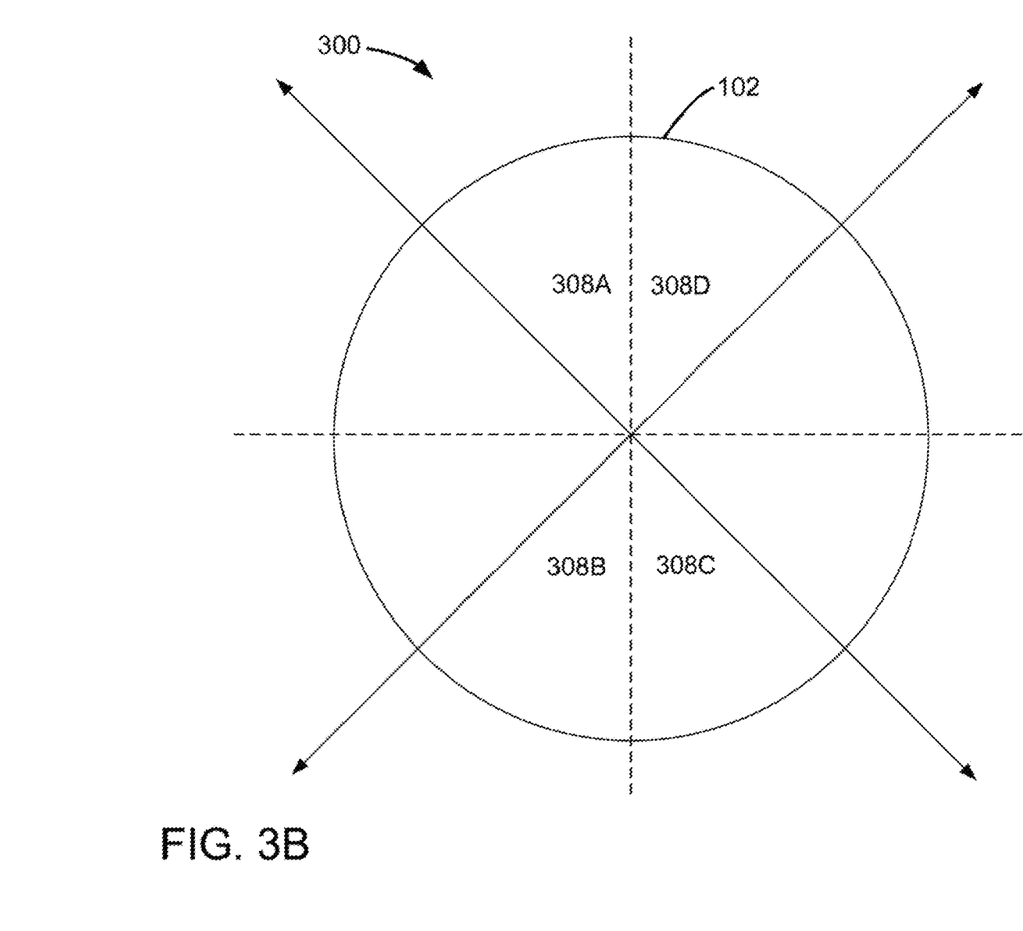
FIG. 3B is a top down view of a liquid rocket engine illustrating quadrants associated with thrust vectoring using nozzle injectors according to at least one embodiment disclosed herein.

The nozzle 102 can be segmented into various quadrants to control the direction to which the nozzle 102 is thrust vectored. Illustrated in further detail in FIG. 3B. FIG. 3B is a top down view of the rocket engine 300 illustrating quadrants (shown as dashed lines) associated with thrust vectoring using nozzle injectors according to at least one embodiment disclosed herein. The rocket engine 300 is illustrated as being divided into quadrants 308A-308D.

In some examples, the rocket engine 300 may include thrust vector valves, thrust plenums, and thrust vector outlets, described by way of example in FIG. 3A, to provide for thrust vectoring in directions indicated in the particular quadrants illustrated in FIG. 3B. One or more of the quadrants 308A-308D may have thrust vectoring applied to provide directional control. It should be understood that the rocket engine 300 may be functionally partitioned into fewer or more than the number of quadrants illustrated in FIG. 3B.

Returning to FIG. 3A, the rocket engine 300 also provides additional detail regarding the coaxial assembly turbines 126 and the propellant pumps assembly 128 mentioned in FIG. 1. As mentioned above, the coaxial assembly turbines 126 are rotated, the rotational motion of which is transferred to the propellant pumps assembly 128 to pump the oxidizer 112 or the fuel 108. In the example illustrated in FIG. 3A, the coaxial assembly turbines 126 include an oxidizer turbine 326A and a fuel turbine 326B. The rotational motion of the oxidizer turbine 326A is used to rotate an oxidizer pump 328A. In a similar manner, the rotational motion of the fuel turbine 326B is used to rotate a fuel pump 328B. The oxidizer pump 328A may be used to pump the oxidizer 112 to one or more secondary injectors 330, the thrust plenums 304A, 304B, or to the pre-burner 120 thru a propellant injector 332. The fuel pump 328B may be used to pump the fuel 108 to the propellant injector 332. It should be understood that the fuel 108 and the oxidizer 112 may be pumped to other areas of the rocket engine 300.

Figure 4:
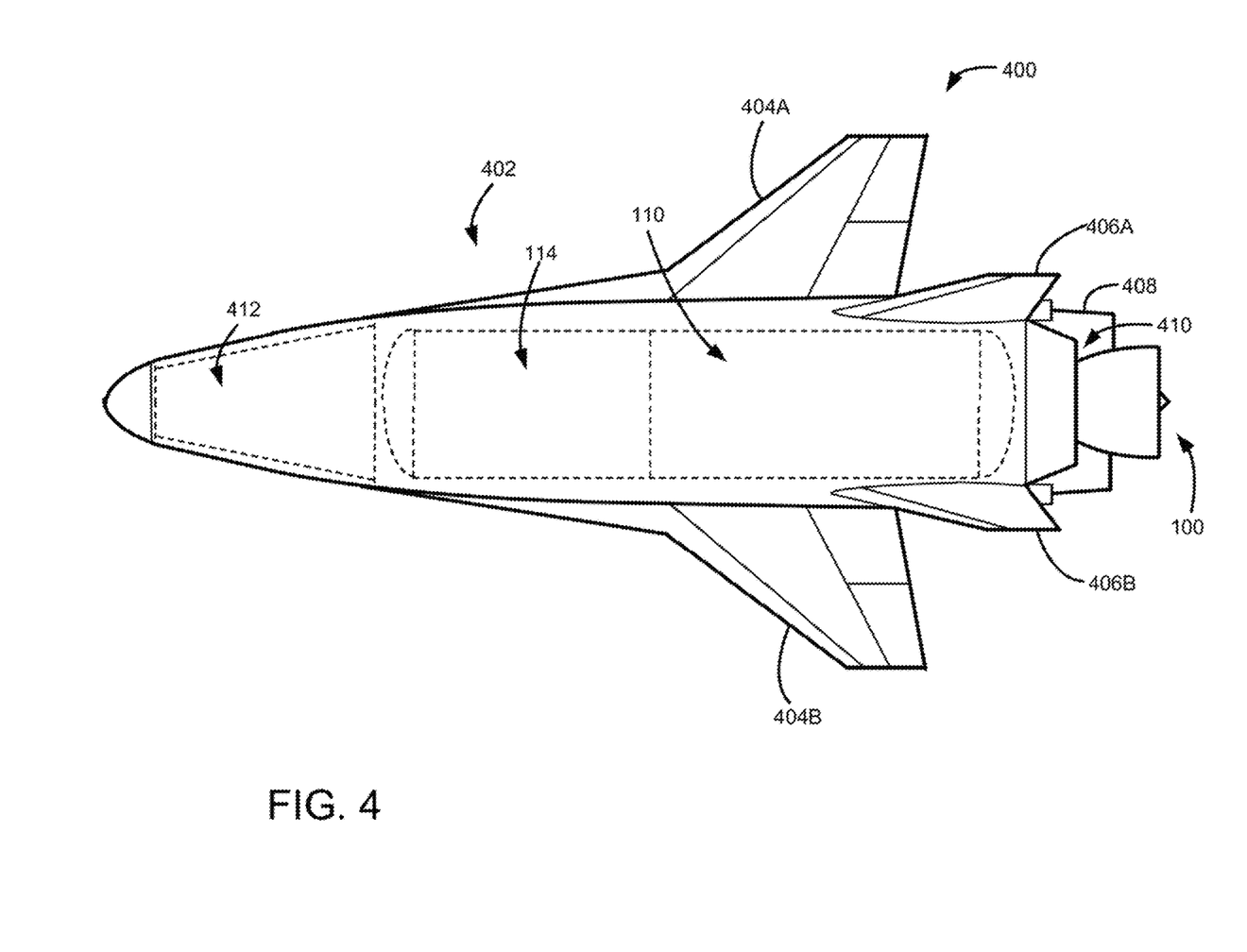
FIG. 4 is a top, cross-sectional view of a launch vehicle according to at least one embodiment disclosed herein.

FIG. 4 is a side, cross-sectional view of a launch vehicle 400 according to at least one embodiment disclosed herein. The launch vehicle 400 can be used in a variety of applications. For example, the launch vehicle 400 can be carried by an aircraft such as a B52H and released for hypersonic or space flight. In other examples, the launch vehicle 400 may be configured to take-off and land under its own power. In military applications, the launch vehicle 400 may be outfitted with conventional or nuclear warheads for payload delivery at an intended target. The launch vehicle 400 may be configured as a single-use or as a re-usable vehicle. In a single-use configuration, the launch vehicle 400 is either rendered inoperable or is not retrievable (such as deep space operations). In a re-usable configuration, the launch vehicle 400 is designed to be retrievable and able to conduct additional missions, with or without maintenance. It should be understood that the presently disclosed subject matter is not limited to any particular use or configuration.

The launch vehicle 400 includes a fuselage 402, wings 404A and 404B, vertical control surfaces 406A and 406B, and body flap 408. One or more of the wings 404A and 404B, the vertical control surfaces 406A and 406B, and the body flap 408 may be used to control the flight of the launch vehicle 400.

The rocket engine 100 may be installed on the launch vehicle 400. As mentioned above, some configurations of the rocket engine 100 may use internal systems, such as the oxidizer injector assembly 132, to provide thrust vector control. Thus, in some configurations, the rocket engine 100 may be firmly affixed to the bulkhead 410 of the launch vehicle 400 without any interstitial gimbal systems. In some conventional designs, a rocket engine may need to be movably affixed to a launch vehicle using a gimbal system. The gimbal system may be used to move the nozzle of the rocket engine to provide thrust vector control.

The launch vehicle 400 may also include the liquid fuel tank 110 and the liquid oxidizer tank 114, which provide the fuel 108 and oxidizer 112 to power the rocket engine 100, respectively. The launch vehicle 400 may also include a payload bay 412 that may be used to store and secure payloads to be delivered. In some examples, the payload bay 412 may also serve as a personnel space if the launch vehicle 400 is used with onboard personnel.

Figure 5:
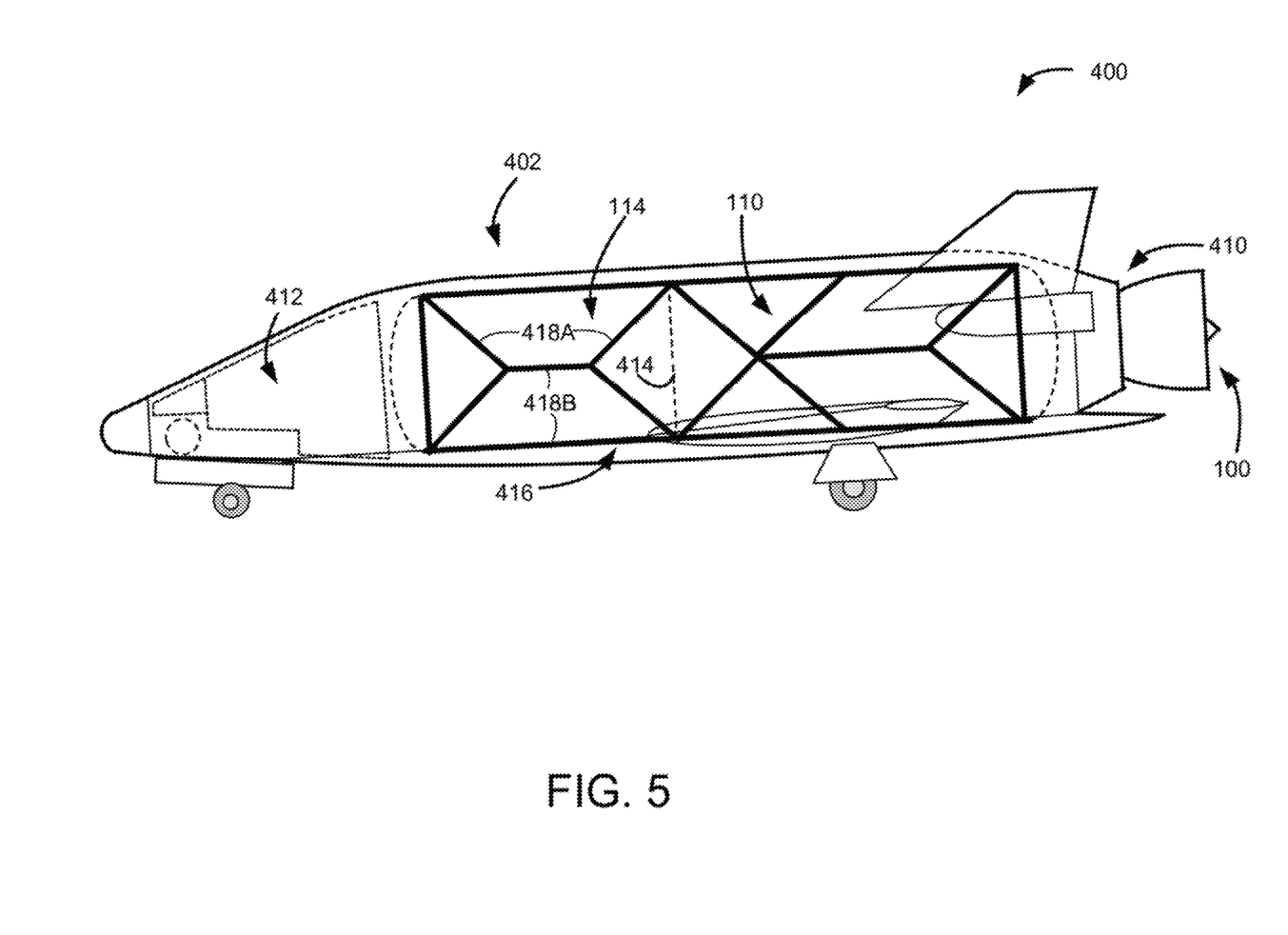
FIG. 5 is a side, cross-sectional view of a launch vehicle, showing a rocket engine, a liquid fuel tank, a liquid oxidizer tank, and a payload bay according to at least one embodiment disclosed herein.

FIG. 5 is a side, cross-sectional view of the launch vehicle 400, showing the rocket engine 100, the liquid fuel tank 110, the liquid oxidizer tank 114, and the payload bay 412 according to at least one embodiment disclosed herein. As mentioned above, the manner in which the fluid flows within the rocket engine 100 may provide some weight gains over similarly powered conventional rocket engines. Additional weight gains may be found by firmly affixing the rocket engine 100 to the bulkhead 410 of the launch vehicle 400 without installing a gimbal system. In some configurations, additional weight savings may be gained by configuring the liquid fuel tank 110 and the liquid oxidizer tank 114.

In one example, the liquid fuel tank 110 and the liquid oxidizer tank 114 may act as load bearing structures for the launch vehicle 400 instead of the outer or inner skin of the fuselage 402 of the launch vehicle 400. The liquid fuel tank 110 and the liquid oxidizer tank 114 may have a common tank dome 414. The common tank dome 414 acts as pressure and liquid barrier between the liquid fuel tank 110 and the liquid oxidizer tank 114. The common tank dome 414 also acts as to firmly affix the liquid fuel tank 110 to the liquid oxidizer tank 114 so that the liquid fuel tank 110 and the liquid oxidizer tank 114 acts as a single structure.

Additional structure stability can be found by using pressurized tanks. In some configurations, the pressure inside the liquid fuel tank 110 and the liquid oxidizer tank 114 is high enough to provide a significant enough force to the walls of the liquid fuel tank 110 and the liquid oxidizer tank 114 to allow the walls of the liquid fuel tank 110 and the liquid oxidizer tank 114 to act as load bearing structures.

In some operations of the launch vehicle 400, the launch vehicle 400 may undergo various forces in vectors that may cause the liquid fuel tank 110 or the liquid oxidizer tank 114 to buckle or otherwise deform. To provide support to the liquid fuel tank 110 and the liquid oxidizer tank 114 to reduce the probability of deformation of the liquid fuel tank 110 or the liquid oxidizer tank 114, one or more tensioning members 416 may be used. The tensioning members 416 are generally illustrated as solid lines within the liquid fuel tank 110 or the liquid oxidizer tank 114. In one example, tensioning members 418A may be used to counteract torsional forces imparted on the liquid oxidizer tank 114 and tensioning members 418B may be used to counteraction stretching forces imparted on the liquid oxidizer tank 114. Other tensioning members 416 may be used to provide for additional support as needed.

In some configurations, the tensioning members 416 can be formed from suitable materials such as, but not limited to, metal cables, nylon, KEVLAR, and the like. The tensioning members 416 may be installed inside the liquid fuel tank 110 and the liquid oxidizer tank 114. The liquid fuel tank 110 and the liquid oxidizer tank 114 may be affixed to the fuselage 402 in a manner suitable to transfer some or all of the loads experienced by the launch vehicle 400 to the liquid fuel tank 110 and the liquid oxidizer tank 114.

Figure 6:
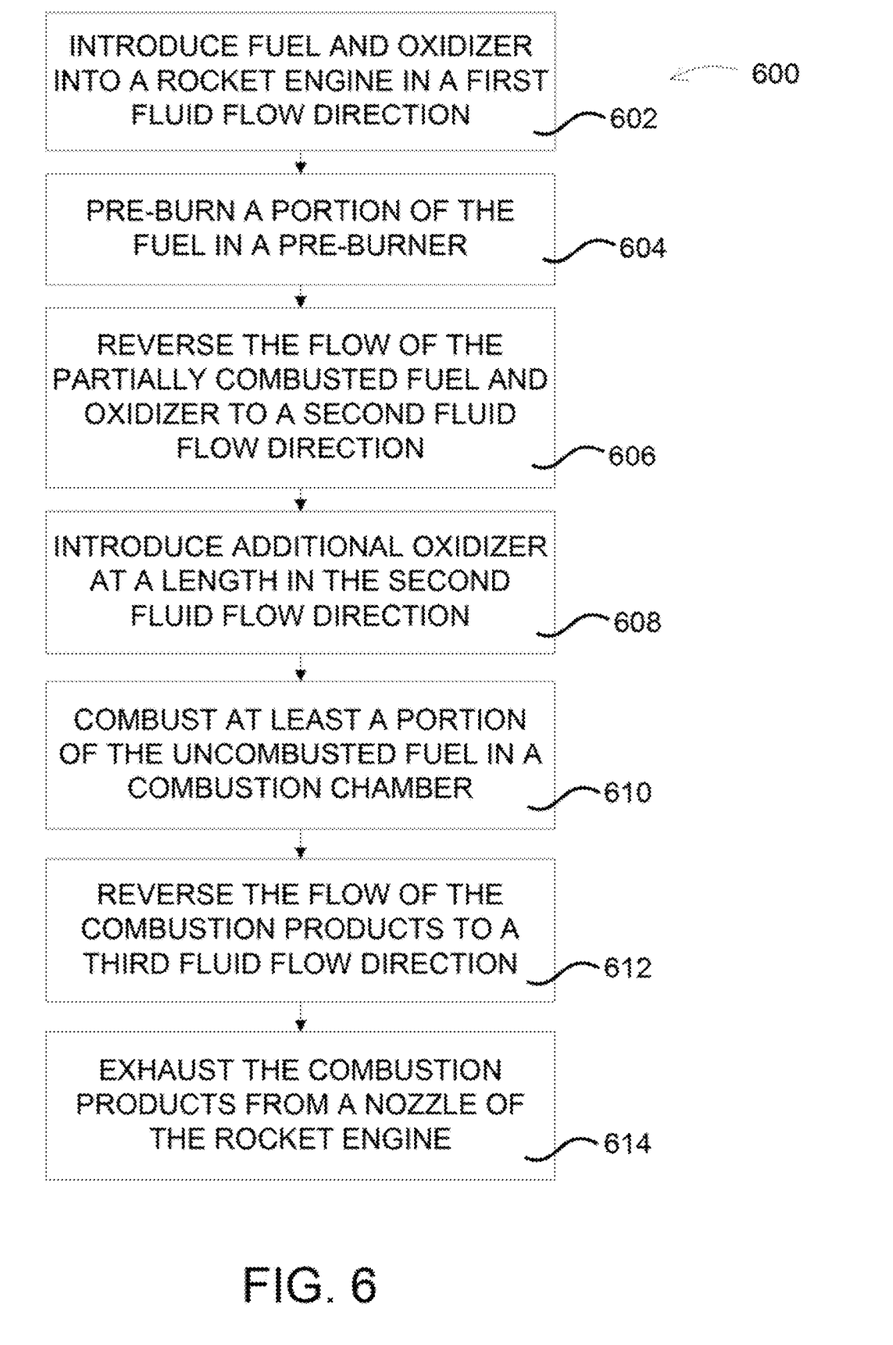
FIG. 6 illustrates one configuration of a routine for operating a rocket engine according to at least one embodiment disclosed herein.

FIG. 6 illustrates one configuration of a routine 600 for operating a rocket engine 100 according to at least one embodiment disclosed herein. Unless otherwise indicated, more or fewer operations may be performed than shown in the figures and described herein. Additionally, unless otherwise indicated, these operations may also be performed in a different order than those described herein.

The routine 600 commences at operation 602, the fuel 108 and the oxidizer 112 are introduced into the rocket engine 100 in a first fluid flow direction. In one configuration, the first fluid flow direction is the same direction as the primary thrust vector produced by the rocket engine 100. The fuel 108 comes from the liquid fuel tank 110 and the oxidizer 112 comes from the liquid oxidizer tank 114.

The routine 600 continues to operation 604, where a portion of the fuel 108 is combusted, or pre-burned, in the pre-burner 120. The pre-burner 120 may be used to combust a portion of the propellant to produce hot gases. The hot gases power the coaxial assembly turbines 126. The coaxial assembly turbines 126 in turn power propellant pumps assembly 128. The propellant pumps assembly 128 supplies the pressure necessary to feed the fuel/oxidizer combination into the main combustion chamber 130.

The routine 600 continues to operation 606, where the direction of the flow of the partially combusted fuel 108 and oxidizer 112 are reversed in the pre-burner 120 to a second fluid flow direction, which is generally opposite to the direction of the first fluid flow direction. It should be appreciated that one or more of the fluids in the rocket engine 100 may not travel in the same direction.

The routine 600 continues to operation 608, where additional oxidizer 112 is introduced into the pre-burned fluid flow. In some configurations, the additional oxidizer 112 may be used to increase the amount of oxidizer 112 to provide correct stoichiometric proportions between the oxidizer 112 and the fuel 108. In other configurations, the oxidizer 112 may be introduced to provide thrust vectoring, described by way of example in FIG. 2.

The routine 600 continues to operation 610, where a least a portion of the remaining fuel 108 and the oxidizer 112 are combusted in the combustion chamber 130. The combustion chamber 130 may be configured to receive the fuel 108 and the oxidizer 112 and provide a high pressure, high temperature chamber in which the fluids may combust. The combustion products produced in the combustion chamber 130 are exhausted through the throat 134.

The routine 600 continues to operation 612, where the flow of the combustion products are reversed back to a third fluid flow direction that is generally in the same direction of the first fluid flow direction. The combustion products exit the combustion chamber 130, flow through the throat 134, and enter an expansion plenum 136. The shape of the expansion plenum 136 and the nozzle 102 redirect the flow of the combustion products from the combustion chamber 130 and direct the combustion products to the nozzle exit 104. The routine 600 continues to operation 614, where the combustion products exit the nozzle exit 104 of the nozzle. The routine thereafter ends.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A method for operating a rocket engine, the method comprising:
   introducing fuel and oxidizer into the rocket engine in a first fluid flow direction;
   pre-burning a portion of the fuel in a pre-burner to produce a partially combusted fuel oxidizer mixture;
   reversing a flow of the partially combusted fuel oxidizer mixture to a second fluid flow direction;
   combusting at least a portion of fuel in the partially combusted fuel oxidizer mixture in a combustion chamber to produce combustion products; and
   reversing a flow of the combustion products to a third fluid flow direction.

2. The method of claim 1, further, comprising introducing additional oxidizer at a length in the second fluid flow direction.

3. The method of claim 2, wherein an amount of the additional oxidizer is introduced to provide correct stoichiometric proportions between the fuel and the oxidizer in the combustion chamber.

4. The method of claim 2, wherein an amount of the additional oxidizer is introduced to provide thrust vector control.

5. The method of claim 1, further comprising exhausting the combustion products from a nozzle of the rocket engine.

6. The method of claim 1, wherein pre-burning a portion of the fuel in a pre-burner to produce a partially combusted fuel oxidizer mixture to provide power to at least one coaxial assembly turbine.

7. The method of claim 6, wherein the at least one coaxial assembly turbine provides power to at least one power propellant pump assembly.

8. The method of claim 1, further comprising cooling at least a surface of the rocket engine using re-generative cooling.

9. The method of claim 1, further comprising reducing an amount of oxidizer introduced from one or more injection ports along a length in the second fluid flow direction to provide thrust vectoring of the rocket engine.

10. A rocket engine, comprising:
a fuel supply line and an oxidizer supply line for introducing fuel and oxidizer into a pre-burner in a first fluid flow direction;
the pre-burner operative to
combust at least a portion of the fuel introduced through the fuel supply line to produce a partially combusted fuel oxidizer mixture, and
reverse a flow of the partially combusted fuel oxidizer mixture to a second fluid flow direction, whereby the first fluid flow direction and the second fluid flow direction are opposing directions;
a combustion chamber operative to combust at least a portion of the partially combusted fuel oxidizer mixture, whereby the combusted fuel oxidizer mixture exits through a throat and an expansion plenum; and
a nozzle having a shape operative to reverse a flow of the combusted fuel oxidizer mixture to a third fluid flow direction.

11. The rocket engine of claim 10, further comprising at least one thrust plenum to provide thrust vector control for the rocket engine.

12. The rocket engine of claim 11, further comprising a thrust vector valve configured to control a flow of the oxidizer into the at least one thrust plenum.

13. The rocket engine of claim 10, further comprising at least one coaxial assembly turbine powered by the partially combusted fuel oxidizer mixture.

14. The rocket engine of claim 13, further comprising at least one power propellant pump assembly powered by the at least one coaxial assembly turbine.

15. The rocket engine of claim 12 further comprising an oxidizer injector assembly operative to introduce additional oxidizer along a length in the second fluid flow direction.

16. The rocket engine of claim 15, wherein the oxidizer injector assembly comprises one or more oxidizer injector ports operative to provide thrust vector control for the rocket engine.

17. The rocket engine of claim 10, further comprising one or more tubes providing re-generative cooling to one or more surfaces of the rocket engine using the oxidizer as a coolant.

18. A launch vehicle comprising:
a rocket engine firmly affixed to a bulkhead of the launch vehicle, the rocket engine comprising
a fuel supply line and an oxidizer supply line for introducing fuel and oxidizer into a pre-burner in a first fluid flow direction,
the pre-burner operative to
combust at least a portion of the fuel introduced through the fuel supply line to produce a partially combusted fuel oxidizer mixture, and
reverse a flow of the partially combusted fuel oxidizer mixture to a second fluid flow direction, whereby the first fluid flow direction and the second fluid flow direction are opposing directions,
a combustion chamber operative to combust at least a portion of the partially combusted fuel oxidizer mixture, whereby the combusted fuel oxidizer mixture exits through a throat and an expansion plenum, and
a nozzle having a shape operative to reverse a flow of the combusted fuel oxidizer mixture to a third fluid flow direction, wherein the third fluid flow direction is generally in a same direction as the first fluid flow direction.

19. The launch vehicle of claim 18, further comprising a liquid fuel tank affixed to a liquid oxidizer tank using a common tank dome, whereby the liquid fuel tank and the liquid oxidizer tank are operative to act as load bearing structures.

20. The launch vehicle of claim 19, further comprising one or more tensioning members installed in the liquid fuel tank or the liquid oxidizer tank operative to counteract one or more forces imparted on the liquid fuel tank or the liquid oxidizer tank.

21. The launch vehicle of claim 20, where the one or more tensioning members comprise metal cables, nylon, or KEVLAR.

* * * * *